United States Patent [19]
LaRoche et al.

[11] Patent Number: 6,092,766
[45] Date of Patent: Jul. 25, 2000

[54] PROCESS FOR FORMING A SURFACE FOR CONTACT WITH A FLOWING FLUID AND BODY WITH SUCH SURFACE REGIONS

[75] Inventors: Ulrich LaRoche, Zurich; Hans Lucas La Roche, Bielti, both of Switzerland

[73] Assignee: Ulrich LaRoche, Zurich, Switzerland

[21] Appl. No.: 09/077,307

[22] PCT Filed: Dec. 9, 1996

[86] PCT No.: PCT/CH96/00432

§ 371 Date: Aug. 31, 1998

§ 102(e) Date: Aug. 31, 1998

[87] PCT Pub. No.: WO97/21931

PCT Pub. Date: Jun. 19, 1997

[30] Foreign Application Priority Data

Dec. 12, 1995 [CH] Switzerland .............................. 3496/95

[51] Int. Cl.[7] .................................................. B64C 21/10
[52] U.S. Cl. ........................... 244/200; 244/198; 244/204
[58] Field of Search .................................. 244/200, 198, 244/204, 130, 199

[56] References Cited

U.S. PATENT DOCUMENTS

| | | |
|---|---|---|
| 3,584,812 | 6/1971 | Brenman .................................. 244/200 |
| 3,741,285 | 6/1973 | Kuethe . |
| 4,619,423 | 10/1986 | Holmes et al. .......................... 244/130 |
| 4,736,912 | 4/1988 | Loebert .................................... 244/130 |
| 4,750,693 | 6/1988 | Lobert et al. ............................ 244/200 |
| 4,753,401 | 6/1988 | Bechert .................................... 244/130 |

FOREIGN PATENT DOCUMENTS

| | | |
|---|---|---|
| 0 543 647 | 5/1993 | European Pat. Off. . |
| WO8001673 | 8/1980 | WIPO . |

OTHER PUBLICATIONS

Lin, J.C. et al, "Control of Turbulent Separated Flow Over a Rearward–Facing Ramp Using Longitudinal Grooves", Journal of Aircraft, vol. 27, No. 3, Mar. 1990, Washington, D.C., pp. 283–285.

Primary Examiner—Peter M. Poon
Assistant Examiner—Judith A. Nelson
Attorney, Agent, or Firm—Walter C. Farley

[57] ABSTRACT

A surface for contact with a fluid, flowing in a flow direction (A) over the surface, is provided with grooves (1) to prevent flow separations at low, local Reynolds numbers. The grooves extend between an upstream-directed, closed groove entrance and a downstream-directed, open groove exit and are inclined to the flow direction (A), at least in the vicinity of the groove entrance.

24 Claims, 4 Drawing Sheets

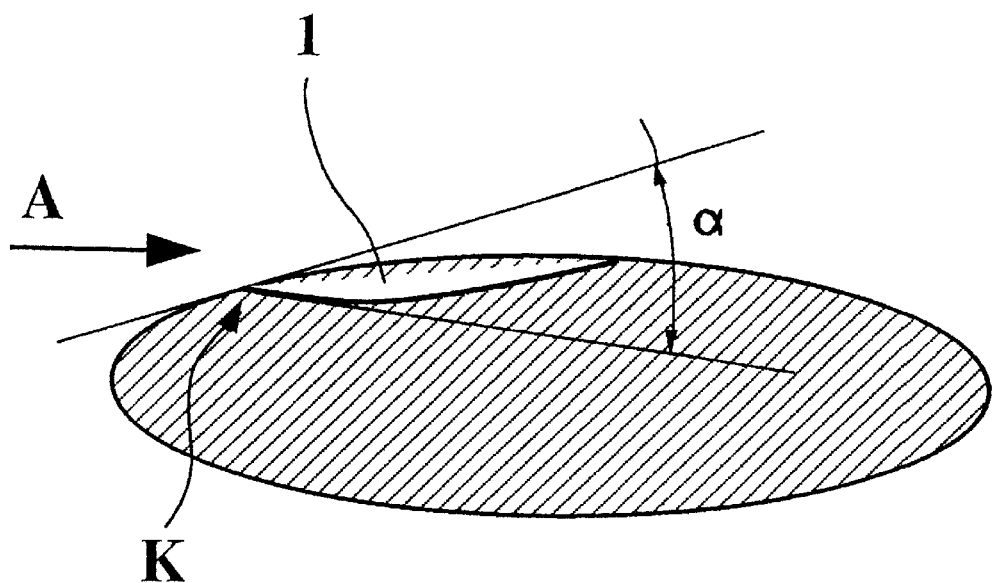
Fig. 7
Fig. 9a
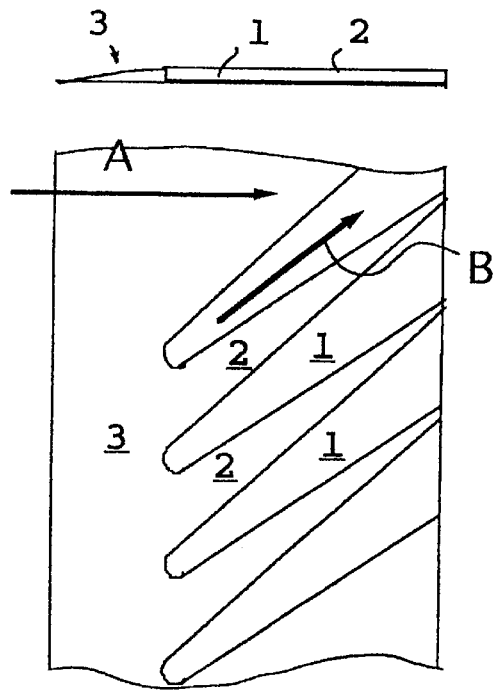
Fig. 9b
Fig. 8a
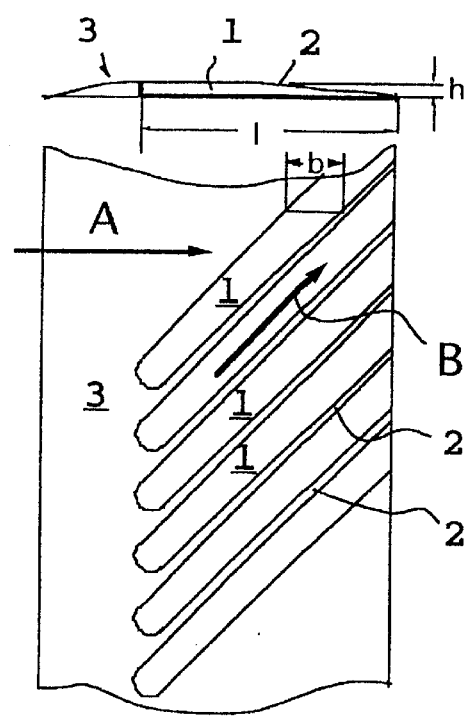
Fig. 8b 6,092,766

1

PROCESS FOR FORMING A SURFACE FOR CONTACT WITH A FLOWING FLUID AND BODY WITH SUCH SURFACE REGIONS

FIELD OF THE INVENTION

This invention relates to a method used for forming a solid surface for contact with a flowing medium. The invention also relates to a body having surface areas formed in accordance with the method of the invention. Such a body can be an airfoil, propeller, fan blade, turbine blade or stirrer. It can also be a body wholly or partly enveloping the flow, such as, e.g., a diffuser.

BACKGROUND OF THE INVENTION

It is known that laminar flows at a local Reynolds number lower than approximately 200,000 and with a positive pressure gradient (pressure rising in the flow direction) do not engage or stay near a surface but instead separate therefrom.

For this reason, the classic wing profile with a smooth or rough surface is consequently only usable above a minimum Reynolds number. For a Reynolds number below this minimum, the laminar boundary layer is separated from the solid surface on the suction side of the wing profile in the vicinity of the profile leading edge. This fact not only limits the use of airfoils, propellers, etc., but also the stirring action of stirrers, with which, in relatively viscous media, laminar flows are produced. This fact also limits the pressure recovery in diffusers.

SUMMARY OF THE INVENTION

An object of the invention is to provide a method by which the surfaces for the contact with a flowing fluid are so constructed that a laminar fluid flow is less easily separated from the surface, i.e., the laminar flow, also in the case of-local Reynolds numbers of less than 200,000 and positive pressure gradients, stays near the surface. A further object of the invention is to provide bodies which have surface areas formed in accordance with the method and which can consequently be used more advantageously at lower Reynolds numbers than the corresponding, known bodies.

This object is achieved by the method for forming surfaces for contact with flowing media and by the body with the correspondingly formed surface areas, wherein the surface for contact with flowing fluid is provided with a plurality of grooves which are inclined to the flow direction and have an upstream-directed, closed entrance and a downstream-directed, open exit. The orientation of the grooves relative to the flow direction, as well as their lengths, widths, depths and mutual spacing are to be adapted to the flow conditions, as will be described hereinafter.

The grooves are made in the surface or the surface is lined with a suitably structured lining.

It has been found that a laminar flow, when flowing over a surface formed in accordance with the invention, produces in the grooves a vacuum as a result of which the flow better engages with the surface. In addition, the fluid at least partly does not directly flow along the solid surface but instead flows over the fluid located in the grooves, which does not flow or flows more slowly and/or in a differently directed manner. As a result, the main flow becomes a free jet, at least over the grooves and in its boundary area shear forces occur which, more particularly in the case of low Reynolds numbers, are much lower than the frictional forces with a solid surface. As a result, the friction loss of a flow over the grooved surface of the inventive body is much lower than the corresponding loss of the same flow over a smooth or rough surface.

Surfaces constructed in accordance with the invention are advantageously used on the suction sides of airfoils in the vicinity of the profile leading edges, particularly in the area of control flaps. Axial fans with surfaces formed in accordance with the invention are usable with lower Reynolds numbers than hitherto, i.e., in areas where up to now redial fans or volumetric pump designs have been necessary. Small flight bodies, for which up to now relatively large wings with long chord lengths (profile depth) had to be used, can be more advantageously constructed with the inventively formed surface areas. The surfaces of entrance areas of diffusers can also be constructed according to the invention, so that much better pressure recoveries are possible. Stirrers with inventively constructed surfaces or surface areas, particularly in media with a relatively high kinematic viscosity, lead to a better engaging flow and therefore to a much better stirring action.

BRIEF DESCRIPTION OF THE DRAWINGS

The formation of surfaces for contact with a flowing fluid, the action thereof and the design thereof, in accordance with the invention, are described in greater detail hereinafter with reference to the attached drawings, wherein:

FIGS. 5 to 7 are perspective and sectional views of further embodiments of surface constructions in accordance with the invention; and FIGS. 8a, 8b, 9a and 9b are sectional and plan views of two embodiments of surface linings, usable to apply a construction in accordance with the invention to suction-side surfaces of airfoils according to FIG. 1.

DESCRIPTION OF PREFERRED EMBODIMENTS

Figure 1:
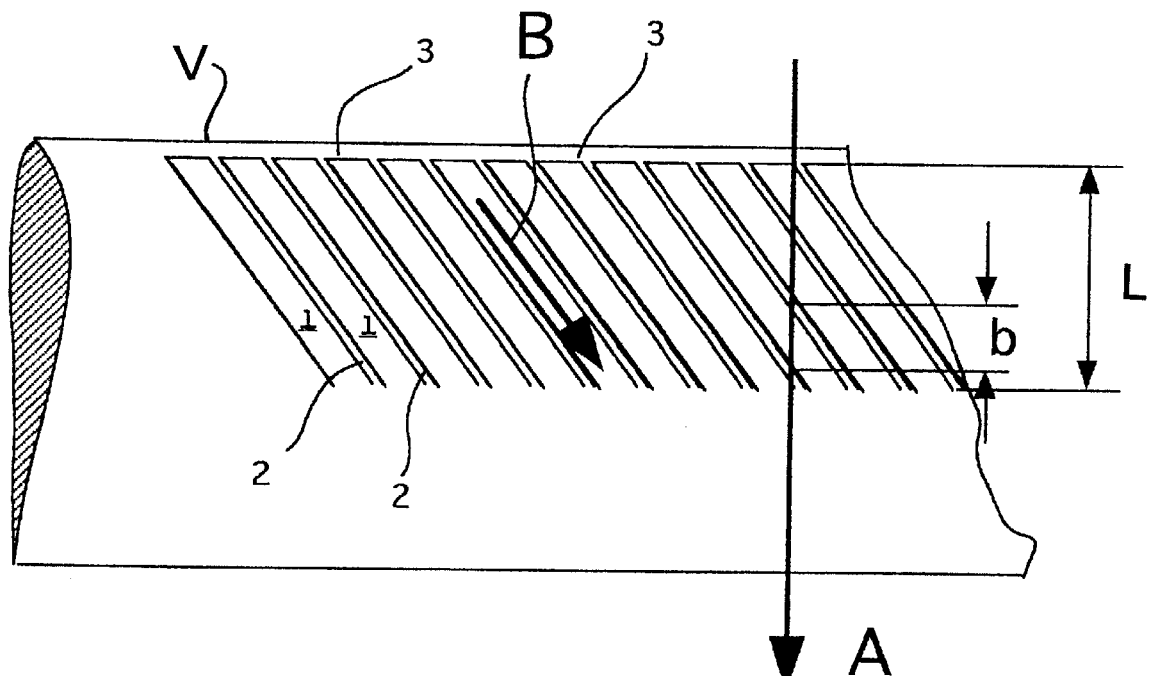
FIG. 1 is a schematic plan view of a wing profile with a surface area formed in accordance with the invention on the suction side in the vicinity of the leading edge.

FIG. 1 schematically shows an airfoil or wing profile, whose suction-side surface is inventively constructed in the area of the leading edge V, the air attack direction being indicated by the arrow A. The inventively constructed surface area has a grooved structure which, in the embodiment shown, comprises a plurality of parallel oriented, substantially linearly directed grooves 1 which extend between longitudinal dams or barriers 2 and are inclined to the flow direction A (groove orientation B). The upstream-directed entrances of the grooves, which are located in the front part of the profile, are closed with suitable transverse dams or barriers 3, while the downstream-directed exits are open. It has proved to be advantageous if the longitudinal dams 2 are narrower than the grooves and are rounded.

Figure 2:
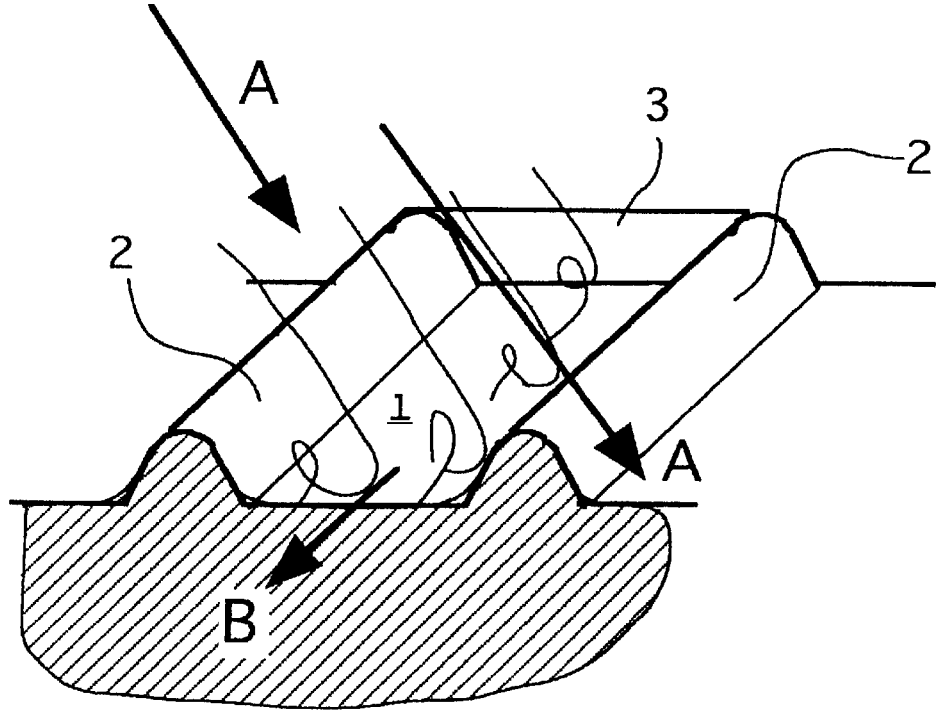
FIGS. 2 and 3 are schematic representations of the operation of surfaces formed in accordance with the invention.

FIG. 2 three-dimensionally shows the entrance of a groove 1, closed with a transverse dam 3, of a surface formed in accordance with the invention. Groove 1 extends between two longitudinal dams 2 in the groove orientation B from its upstream-directed entrance to a further downstream-located exit. The flow direction A is inclined to the groove orientation B. The drawing shows how the component of the friction pumps the medium in the wake of the groove in the groove orientation B toward the groove exit, not shown in FIGS. 2 and 3, so that a vacuum is formed in the groove.

Figure 3:
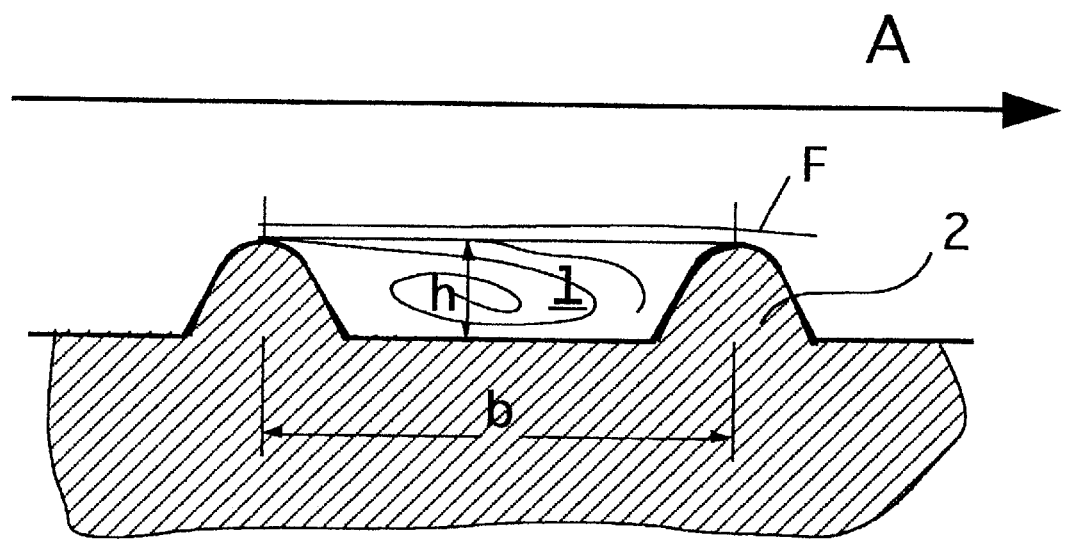

In a sectional representation (plane parallel to flow direction A), FIG. 3 shows the same groove 1 as in FIG. 2. Of the grooved structure parameters, it is possible to see the groove depth h and groove width b in the flow direction (including the longitudinal dam width). In FIG. 1 the groove length L is shown as a further parameter. Also shown is the free jet boundary F, along which the flow progresses between longitudinal dams 2. Since, as has been mentioned hereinbefore, much less friction is formed in the boundary layer between the fluid trapped in the grooves and the fluid flowing above the same as a free jet than in the boundary layer between the solid surface of the longitudinal dams and the flowing fluid, as shown, said longitudinal dams are to be made as narrow as possible.

Figure 4:
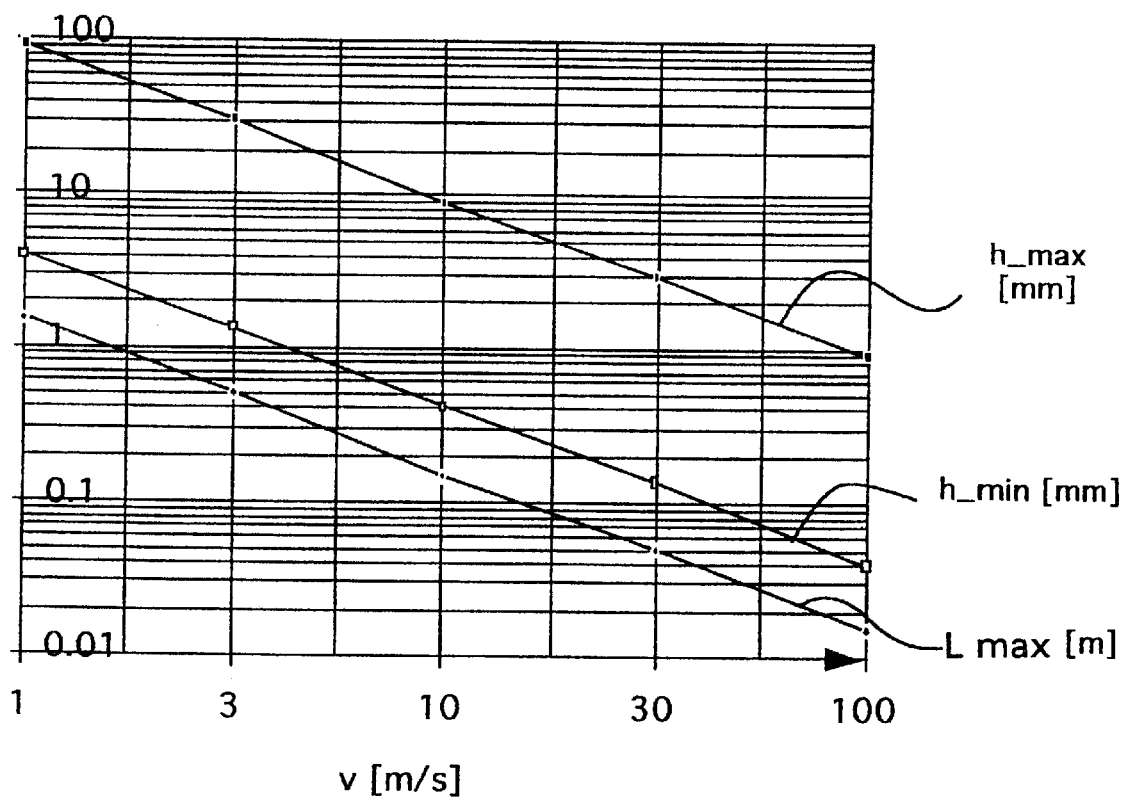
FIG. 4 is a graphical diagram for quantifying the inventive formation of surfaces for contact with a flowing fluid.

FIG. 4 shows a diagram for quantifying the surface formation according to the invention. The diagram shows, for air as the flowing fluid, as a function of the flow rate v [m/s], the parameters of the grooved structure: the maximum groove depth $h_{max}$[mm], the minimum groove depth $h_{min}$ [mm] and the maximum groove length $L_{max}$[m] (parallel to the flow direction). The diagram results from the fact that the Reynolds number formed with the groove depth h must be lower than 6,000 for a laminar flow. The groove width b (in the flow direction A) Results from the fact that it must be no more than 6 to 12 times the groove depth, so that the resulting free jet boundary covers the entire groove width.

The diagram of FIG. 4 applies for a kinematic viscosity v (nu) of $1.5 \cdot 10^{-5}$ (air at sea level), while for other media the ordinate values are to be multiplied by $(v/1.5 \cdot 10^{-5})$.

As an example, FIG. 4 gives for a flow rate of 3 m/s, as is standard for a small air fan, a maximum groove length (laminar running length) of 0.5 m, a minimum groove depth h of 1.5 mm and a maximum groove depth of 30 mm.

Figure 5:
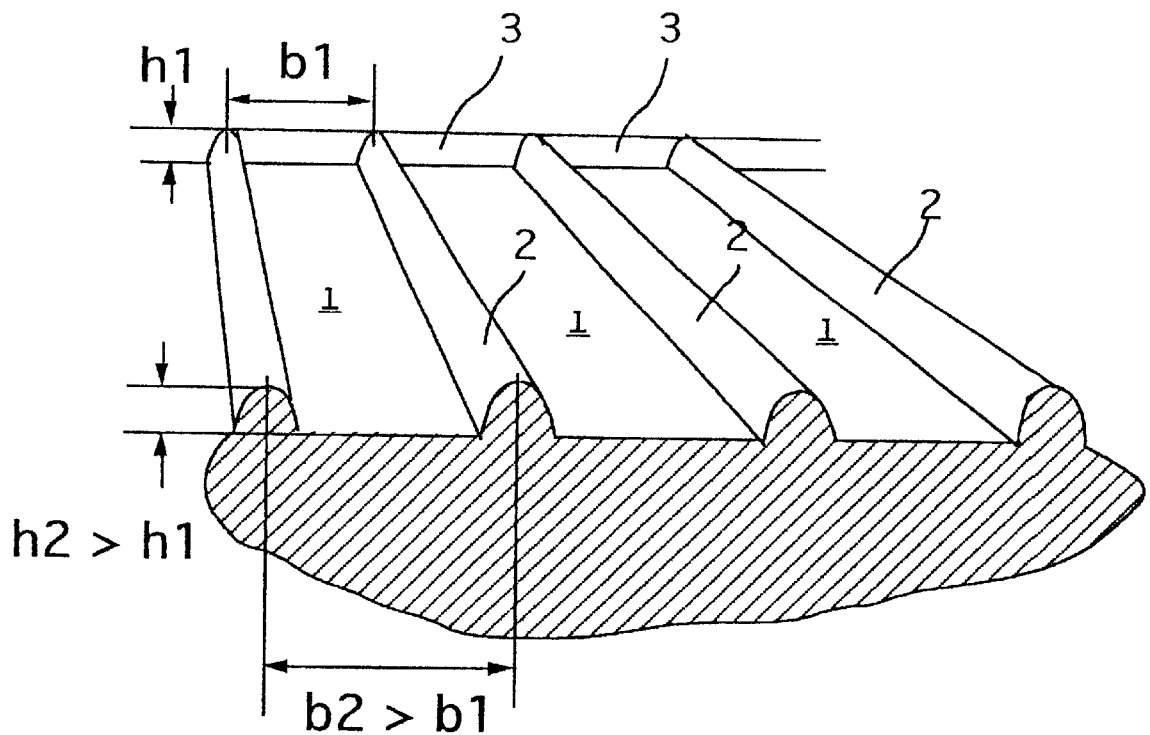

FIG. 5 shows an inventively formed surface for contact with a flowing fluid. The grooves formed in this surface become wider and deeper in a direction from the upstream groove entrance. toward the downstream groove exit. Grooved structures with only widening (cf FIGS. 8a, 8b, 9a and 9b) or only deepening grooves are conceivable.

Figure 6:
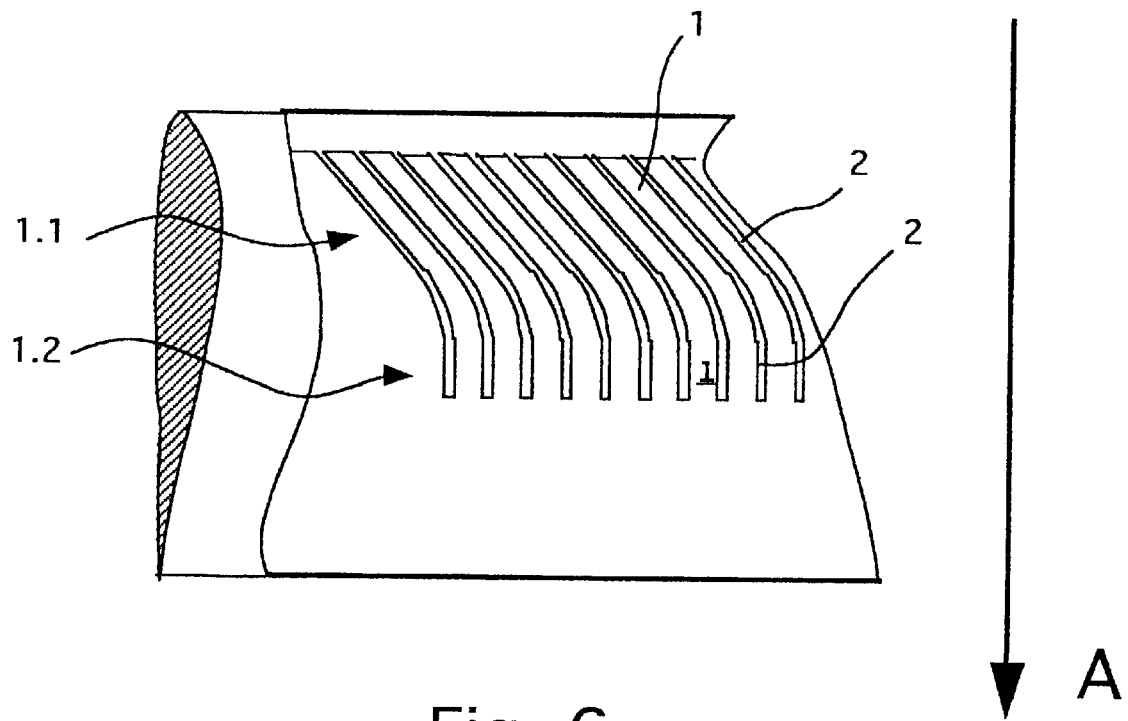

FIG. 6 shows an inventively formed surface of an airfoil with curved grooves 1, which are inclined to flow direction A only in the areas of their entrances 1.1 while exit areas 1.2 are oriented substantially parallel to flow direction A, in order to improve the transfer to the following, ungrooved wall area.

On surfaces with a limited curvature, it is advantageous to close the groove entrances with an effective transverse dam, as shown in FIGS. 2 and 6. On surfaces with a more pronounced curvature, it is sufficient to provide an edge as the closure at the groove entrance so that said edge defines a finite entrance angle a with the groove bottom. This is illustrated in FIG. 7, which is a section in the groove orientation through an ellipsoidal airfoil profile. Groove 1 starts at entrance edge K which is located in the area of the lowest pressure, and extends rearwardly with decreasing depth. Its exit is formed by a continuous transition of the groove bottom into the ungrooved profile surface.

As stated hereinbefore, a surface for contact with a flowing fluid can be inventively constructed by suitable shaping or can be lined with a suitable lining. FIGS. 8a, 8b, 9a and 9b show embodiments of strip-like linings such as can, e.g., be used on airfoils, where they are advantageously applied substantially parallel to the profile leading edge. The linings are shown in FIGS. 8b and 9b in plan view and in section in FIGS. 8a and 9a along groove orientation B.

Examples of parameters for the strip-like surface lining shown in FIGS. 8a, 8b, 9a and 9b are for a flow direction A in the case of an airflow (normal pressure) of v=approximately 100 km/h for the lining of FIGS. 8a and 8b: groove length L=20 mm, groove width b=5 mm, groove depth h=1.5 mm, angle between groove orientation and flow direction approximately 45°. For the lining of FIG. 9: groove length L=20 mm, groove width b=approximately 8 mm (including the longitudinal dam width), groove depth h=1.5 mm and angle between groove orientation and flow direction approximately 45°.

FIGS. 8a, 8b, 9a and 9b also make it clear that transverse dam 3 is advantageously given a streamlined construction on an upstream-directed side and that the longitudinal dams have the same height over the entire groove length (FIG. 9a), i.e. the groove depth h is constant, or the longitudinal dams have a height decreasing in the flow direction (FIG. 8a), or the grooves have a decreasing depth.

The surface linings of FIGS. 8a, 8b, 9a and 9b are advantageously made from a plastics material, which is so flexible that it can adapt to the formed surface. It is advantageously manufactured in relatively great lengths and cut to lengths appropriate for the particular application.

Bearing surfaces in front airfoil areas with small local reynolds numbers, where dirt has a very sensitive boundary layer-separating action, are lined with linings according to FIGS. 8a–9b so that dirt-caused boundary layer separations can be largely prevented.

What is claimed is:

1. A method for avoiding separation between a fluid flowing in laminar flow along a solid surface and the solid surface and for reducing frictional resistance between the fluid and the surface, the method comprising the steps of providing the surface with a plurality of substantially parallel grooves each groove having a length, a depth and a width wherein the length is larger than the depth and larger than the width, each groove being substantially linear along its length and having a closed end at one end of the length and an open end at an opposite end of the length, and orienting the plurality of grooves relative to the laminar flow such that the grooves are oblique to the flow direction with the closed ends at upstream ends of the grooves and open ends at downstream ends of the grooves.

2. The method of claim 1 wherein the step of providing includes selecting the groove length, depth and width as a function of fluid viscosity and flow speed.

3. The method of claim 1 wherein the step of providing includes forming a sheet of material with the plurality of grooves in one side thereof and attaching the formed sheet of material to the solid surface.

4. A method for avoiding separation between a fluid flowing in laminar flow along a solid surface and the solid surface and for reducing frictional resistance between the fluid and the surface, the method comprising the steps of providing the surface with a plurality of substantially parallel grooves each groove having a length, a depth and a width wherein the length is larger than the depth and larger than the width, each groove being arched along at least a portion of its length and having a closed end at one end of the length and an open end at an opposite end of the length, and orienting the plurality of grooves relative to the laminar flow such that the grooves are oblique to the flow direction with the closed ends at upstream ends of the grooves and open ends at downstream ends of the grooves.

5. The method of claim 4 wherein the step of providing includes selecting the groove length, depth and width as a function of fluid viscosity and flow speed.

6. The method of claim 4 wherein the step of providing includes forming a sheet of material with the plurality of grooves in one side thereof and attaching the formed sheet of material to the solid surface.

7. A surface structure for avoiding separation between said surface and a fluid flowing in laminar flow in a flow direction across said surface, the structure comprising a plurality of substantially parallel grooves extending across said surface, each of said grooves having a length, a depth to a bottom surface and a width wherein said length is greater than either said depth or said width, said grooves being substantially linear and being positioned on said surface at an angle to said flow direction, said angle having the same sense and size throughout said length; and means at an upstream end of each said groove closing said upstream end, each said downstream end being unobstructed.

8. The structure of claim 7 wherein said grooves comprise longitudinal dams separating adjacent ones of said grooves along their lengths, each said dam having a width smaller that said width of said groove.

9. The structure of claim 7 wherein each said groove has a width increasing from said upstream end to said downstream end.

10. The structure of claim 7 wherein each said groove has a depth increasing from said upstream end to said downstream end.

11. The structure of claim 7 wherein each said groove has a depth decreasing from said upstream end to said downstream end.

12. The structure of claim 7 wherein said means closing said upstream end comprises a ridge substantially perpendicular to said groove length.

13. The structure of claim 7 wherein said means closing said upstream end comprises an edge between said groove and said surface substantially perpendicular to said groove length, and a portion of said groove bottom sloping away from said edge at a finite angle (a) with said surface.

14. The structure according to claim 7 wherein said structure is part of a device having a low pressure side and a high pressure side, and said structure is on said low pressure side.

15. The structure according to claim 7 wherein said structure is part of a device having a leading edge and a trailing edge, said structure being positioned adjacent said leading edge.

16. A surface structure for avoiding separation between said surface and a fluid flowing in laminar flow in a flow direction across said surface, the structure comprising a plurality of substantially parallel grooves extending across said surface, each of said grooves having a length, a depth to a bottom surface and a width wherein said length is greater than either said depth or said width, each said groove being arched along at least a portion of its length and being positioned on said surface at an angle to said flow direction, said angle having the same sense and size throughout said length; and means at an upstream end of each said groove closing said upstream end, each said downstream end being unobstructed.

17. The structure of claim 16 wherein said grooves comprise longitudinal dams separating adjacent ones of said grooves along their lengths, each said dam having a width smaller that said width of said groove.

18. The structure of claim 16 wherein each said groove has a width increasing from said upstream end to said downstream end.

19. The structure of claim 16 wherein each said groove has a depth increasing from said upstream end to said downstream end.

20. The structure of claim 16 wherein each said groove has a depth decreasing from said upstream end to said downstream end.

21. The structure of claim 16 wherein said means closing said upstream end comprises a ridge substantially perpendicular to said groove length.

22. The structure of claim 16 wherein said means closing said upstream end comprises an edge between said groove and said surface substantially perpendicular to said groove length, and a portion of said groove bottom sloping away from said edge at a finite angle ($\alpha$) with said surface.

23. The structure of claim 16 wherein said structure is part of a device having a low pressure side and a high pressure side, and said structure is on said low pressure side.

24. The structure of claim 16 wherein said structure is part of a device having a leading edge and a trailing edge, said structure being positioned adjacent said leading edge.

* * * * *